(«12») United States Patent
Ejima et al.

(10) Patent No.: US 9,317,771 B2
(45) Date of Patent: Apr. 19, 2016

(54) DEVICE AND METHOD TO DETECT AN OBJECT AND CONTROLLING A DEVICE TO PICK UP THE DETECTED OBJECT

(71) Applicants: KYUSHU INSTITUTE OF TECHNOLOGY, Kitakyushu-shi (JP); KABUSHIKI KAISHA YASKAWA DENKI, Kitakyushu-shi (JP)

(72) Inventors: Toshiaki Ejima, Fukuoka (JP); Shuichi Enokida, Fukuoka (JP); Masakazu Sadano, Fukuoka (JP); Hisashi Ideguchi, Fukuoka (JP); Tomoyuki Horiuchi, Fukuoka (JP); Toshiyuki Kono, Fukuoka (JP)

(73) Assignees: KYUSHU INSTITUTE OF TECHNOLOGY, Kitakyushu-Shi (JP); KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 135 days.

(21) Appl. No.: 14/184,638

(22) Filed: Feb. 19, 2014

(65) Prior Publication Data
US 2014/0233807 A1 Aug. 21, 2014

(30) Foreign Application Priority Data
Feb. 20, 2013 (JP) .................................. 2013-030667

(51) Int. Cl.
G06K 9/00 (2006.01)
G06K 9/46 (2006.01)
G06T 7/00 (2006.01)
G06K 9/62 (2006.01)

(52) U.S. Cl.
CPC .......... *G06K 9/4633* (2013.01); *G06K 9/00214* (2013.01); *G06K 9/6211* (2013.01); *G06T 7/0046* (2013.01)

(58) Field of Classification Search
None
See application file for complete search history.

(56) References Cited

FOREIGN PATENT DOCUMENTS

JP 5088278 B2 4/2010

*Primary Examiner* — Nirav G Patel
(74) *Attorney, Agent, or Firm* — Mori & Ward, LLP

(57) ABSTRACT

In an object detecting method according to an embodiment, external reference points are set in external space of a model of an object and an internal reference point is set in internal space of the model. A table is stored in which feature quantities on a local surface of the model are associated with positions of the external reference points and the internal reference point. The feature quantity on the local surface of the model is calculated, and the position of the reference point whose feature quantity is identical to the calculated feature quantity is acquired from the table and is converted into a position in a real space. When the converted position is outside the object, the position is excluded from information for estimation and the position and the attitude of the object are estimated.

17 Claims, 12 Drawing Sheets

| FEATURE QUANTITY | POSITION VECTORS OF REFERENCE POINTS |
|---|---|
| H1 | $(d_1^1, d_1^2, d_1^3, d_1^4)$ <br> ⋮ |
| H2 | $(d_2^1, d_2^2, d_2^3, d_2^4)$ <br> ⋮ |
| ⋮ | ⋮ |

DEVICE AND METHOD TO DETECT AN OBJECT AND CONTROLLING A DEVICE TO PICK UP THE DETECTED OBJECT

CROSS-REFERENCE TO RELATED APPLICATION

This application is based upon and claims the benefit of priority of the prior Japanese Patent Application No. 2013-030667, filed on Feb. 20, 2013, the entire contents of which are incorporated herein by reference.

FIELD

The embodiments discussed herein are directed to an object detecting method and an object detecting device.

BACKGROUND

Japanese Patent No. 5088278 discloses an object detecting method in which a distance from a distance sensor to a point located on an edge of an object is subjected to Hough transform to cast votes in Hough spaces and the position and the attitude of the object are detected based on the point having the largest number of votes in the Hough spaces.

However, in such an object detecting method using Hough transform, the number of votes in Hough spaces is enormous, resulting in a problem that the amount of processing required for detecting the position and the attitude of an object excessively increases.

SUMMARY

An object detecting method according to one aspect of an embodiment includes: setting a plurality of external reference points used as information for estimating a position and an attitude of an object in external space of a model of the object, and setting an internal reference point used as information for determining whether the information for estimation is valid in internal space of the model; storing a table in which feature quantities on a local surface including a pair of a starting point and an endpoint that are sequentially selected from a, point group located on a surface of the model are associated with a set of positions of the external reference points and the internal reference point with respect to the starting point; sequentially selecting a pair of a starting point and an endpoint from a sample point group located on a surface of the object existing in real space, and calculating feature quantities of the object on a local surface including the pair of the starting point and the endpoint; and acquiring, from the table, the set of positions associated with feature quantities matching the feature quantities of the object, transforming this set into a set of positions in the real space, and when the position of the internal reference point in the set of positions is outside the object, estimating the position and the attitude of the object with the positions of the external reference points in the set of positions excluded from the information for estimation.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Embodiments of an object detecting method and an object detecting device disclosed in the present application will now be described in detail with reference to the accompanying drawings. It should be noted that the present invention is not limited by the embodiments described below. A case where the shape of an object whose position and attitude are to be detected is a cylindrical shape will be described below as an example, but the shape of the object to be detected is not limited to the cylindrical shape.

Figure 1A:
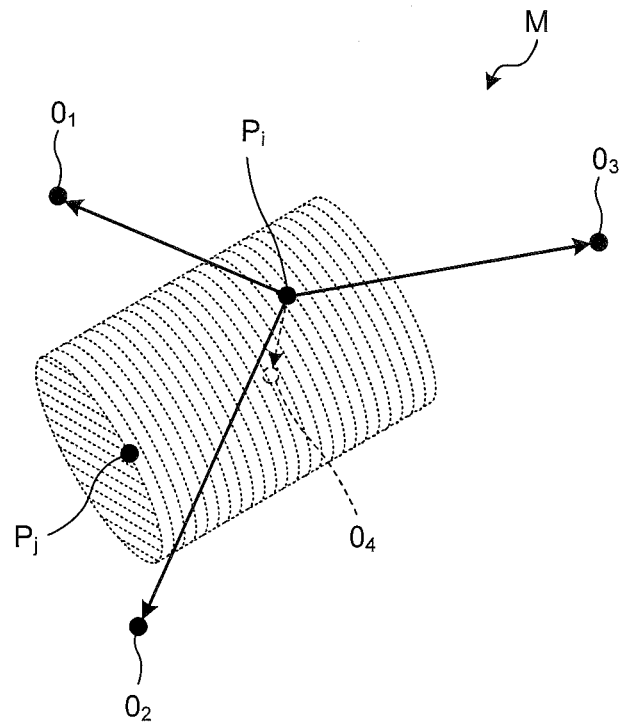
FIG. 1A and FIG. 1B are diagrams illustrating an object detecting method according to an embodiment.
Figure 1B:
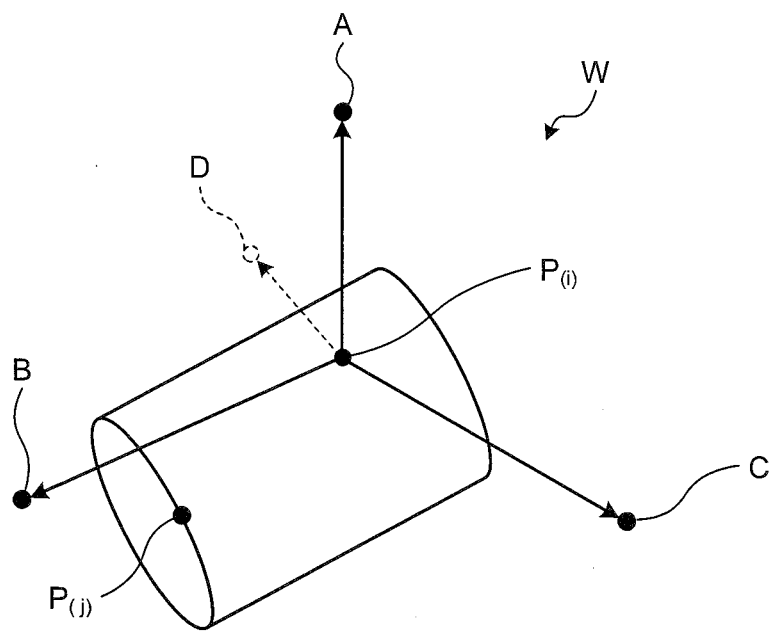

FIG. 1A and FIG. 1B are diagrams illustrating an object detecting method according to an embodiment. As depicted in FIG. 1A, in the object detecting method according to the embodiment, information indicating a surface shape of a model M is acquired. The model M has the same shape as that of the object to be detected and the position and the attitude of the model M in real space are known.

More specifically, information on each point of a point group located on a surface of the model M is acquired. The information on each point includes three-dimensional position information (position vector) in the real space for each point and information on a normal vector with respect to the surface of the model M at each point.

Subsequently, a plurality of external reference points $O_1$, $O_2$, and $O_3$ used as information for estimating the position and the attitude of the object are set in external space of the model M, and an internal reference point $O_4$ used as information for determining whether the information for estimating the position and the attitude of the object is valid is set in internal space of the model M. The number of the reference points thus set is not limited to this.

Feature quantities of a local surface of the model M including a pair of a starting point $P_i$ and an endpoint $P_j$ that are sequentially selected from the point group located on the surface of the model M are calculated. These feature quantities are, for example, the distance between the starting point $P_i$ and the endpoint $P_j$, the inner product between normal lines at the starting point $P_i$ and at the endpoint $P_j$, and the inner product between the normal line at the starting point $P_i$ and a vector connecting the starting point $P_i$ and the endpoint $P_j$.

Subsequently, a table in which the feature quantities thus calculated are associated with a set of position vectors of the external reference points $O_1$, $O_2$, and $O_3$ and the internal reference point $O_4$, with respect to the starting point $P_i$ (see arrows from the starting point $P_i$ to the external reference points $O_1$, $O_2$, and $O_3$ and the internal reference point $O_4$) is prepared and stored. These steps are performed off-line in advance before the position and the attitude of an object existing in the real space are detected.

After that, as depicted in FIG. 1B, information indicating a surface shape of a surface of the object M existing in the real space is acquired. Although illustration is omitted herein, the information indicating the surface shape of the surface of an object W includes three-dimensional position information (position vector) in the real space for a sample point group located on the surface of the object W.

Subsequently, a pair of a starting point $P_{(i)}$ and an endpoint $P_{(j)}$ is sequentially selected from the sample point group, feature quantities of the object W at a local surface including the pair of the starting point $P_{(i)}$ and the endpoint $P_{(j)}$ are calculated, and a set of a plurality of position vectors with which feature quantities matching the feature quantities of the object W are associated is acquired from the table previously stored.

If the position of the starting point $P_i$ acquired herein in the model M matches the position of the starting point $P_{(i)}$ selected from the sample group in the object W, the correct positions of reference points of the object W can be acquired by transforming the set of the acquired position vectors into position vectors in the real space. Accordingly, based on three position vectors thus transformed, the correct position and attitude of the object W can be estimated and detected.

The position of the starting point $P_i$ of the position vectors in the model M acquired from the table may not match the position of the starting point $P_{(i)}$ in the object W selected from the sample group. For example, depending on the position or the attitude of the object W, feature quantities of a local surface in the object W may match feature quantities of a local surface in the model M even when the position of the starting point $P_{(i)}$ in the object W differs from the position of the starting point $P_i$ in the model M.

In this case, even if the set of the position vectors acquired from the table is transformed into the position vectors in the real space, the correct positions of the reference points of the object W cannot be acquired, and thus the correct position and attitude of the object W cannot be detected.

In view of this, in the object detecting method according to the embodiment, Hough transform is used to transform a plurality of sets of position vectors acquired from the table into sets of position vectors in the real space, and votes are cast for voting points in the real space being Hough space that correspond to three-dimensional positions indicated by the transformed position vectors. Among sets of voting points for three of which votes are cast each time, position vectors in the set of voting points having the largest number of votes obtained is determined to be the correct positions of the reference points of the object W, and the position and the attitude of the object W is determined based on these positions.

However, when all sets of position vectors acquired from the table are to be voted for, a problem arises that the amount of processing for detecting the position and the attitude of the object W excessively increases. In addition, as described above, the sets of position vectors acquired from the table contain a position vector that is inappropriate as information for estimating the position and the attitude of the object W.

Furthermore, depending on the position or the attitude of the object W, a voting point for such a position vector that is inappropriate as information for estimating the position and the attitude may receive votes more than the number of voting points for appropriate position vectors, and thus the accuracy of detecting the position and the attitude of the object W may decrease.

In view of this, in the object detecting method according to the embodiment, by excluding sets of position vectors that are inappropriate as information for estimating the position and the attitude from sets to be voted for before casting votes, the detection accuracy is improved with a reduced amount of processing required for detecting the position and the attitude of the object.

More specifically, when a set of position vectors acquired from the table is transformed into position vectors in the real space, it is assumed that the external reference points $O_1$, $O_2$, and $O_3$ set in the model M are located at three points A, B, and C in the real space and the internal reference point $O_4$ is located at a point D outside the object W as depicted in FIG. 1B.

As depicted therein, when the internal reference point $O_4$ that should normally exist inside the object W exists at the point D outside the object W, the three points A, B, and C in the real space contained in the same set as that of the point D are excluded from points to be voted for, i.e., from information for estimating the position and the attitude of the object W.

Consequently, by the object detecting method according to the embodiment, before votes are cast, a set of position vectors that are inappropriate as information for estimating the position and the attitude can be excluded from sets to be voted for, whereby the detection accuracy is improved with a reduced amount of processing required for detecting the position and the attitude of the object W.

When the point D in the real space corresponding to the internal reference point $O_4$ set in the model M appropriately exist inside the object W, votes are cast for the positions of the three points A, B, and C in the real space corresponding to the external reference points $O_1$, $O_2$, and $O_3$, and the position and the attitude is detected based on the vote result. Details of the object detecting method will be described later together with operation of the object detecting device according to the embodiment.

Figure 2:
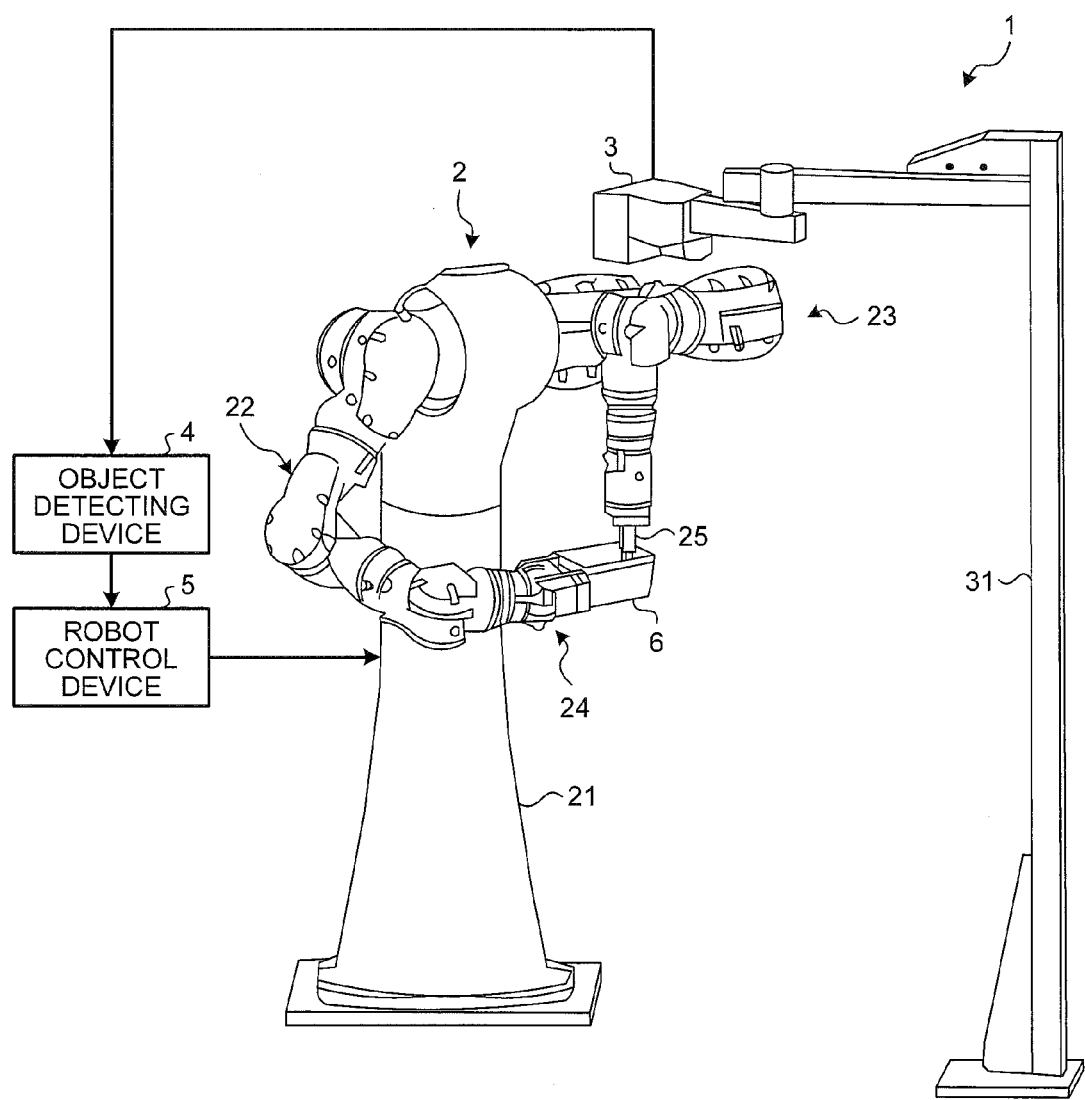
FIG. 2 is a diagram illustrating a robot system according to the embodiment.

A robot system including the object detecting device according to the embodiment will be described hereinafter with reference to FIG. 2. FIG. 2 is a diagram illustrating this robot system 1 according to the embodiment. As depicted in FIG. 2, the robot system 1 includes a robot 2, a sensor 3, this object detecting device 4, and a robot control device 5.

The robot 2 includes a torso portion 21 mounted, for example, on a floor, and a right arm 22 and a left arm 23 that stretch from the torso portion 21. The right arm 22 and the left arm 23 are robot arms each having seven-axis degrees of freedom. A hand 24 for holding a box 6 in which cylindrical objects W are stored in bulk is provided at the end of the right arm 22, and a hand 25 for picking up the objects W from the inside of the box 6 is provided at the end of the left arm 23.

The sensor 3 is a sensor for detecting the three-dimensional shape of the objects W stored in bulk in the box 6, and is a three-dimensional scanner, for example. The sensor 3 is supported by a support 31 and arranged vertically above the box 6.

The sensor 3 scans the object W with a laser beam to detect the three-dimensional shape of the objects W on the basis of the reflected beam reflected from the objects W. The sensor 3 outputs information indicating the three-dimensional shape of the objects W (hereinafter, referred to as "scene data") to the object detecting device 4. The scene data includes the above-described three-dimensional position information (position vector) in the real space for the sample point group located on the surface of the object W.

The object detecting device 4 detects the positions and the attitudes of the objects W stored in bulk in the box 6 on the basis of scene data input from the sensor 3 and the above-described table, and outputs the position and the attitude of an object W to be held by the robot 2 to the robot control device 5. One example of configuration of the object detecting device 4 will be described later with reference to FIG. 3.

The robot control device 5 generates a control signal for the robot 2 on the basis of the position and the attitude of the object W to be held input from the object detecting device 4, and causes the robot 2 to perform operation of picking up the object W by outputting the control signal to the robot 2.

Figure 3:
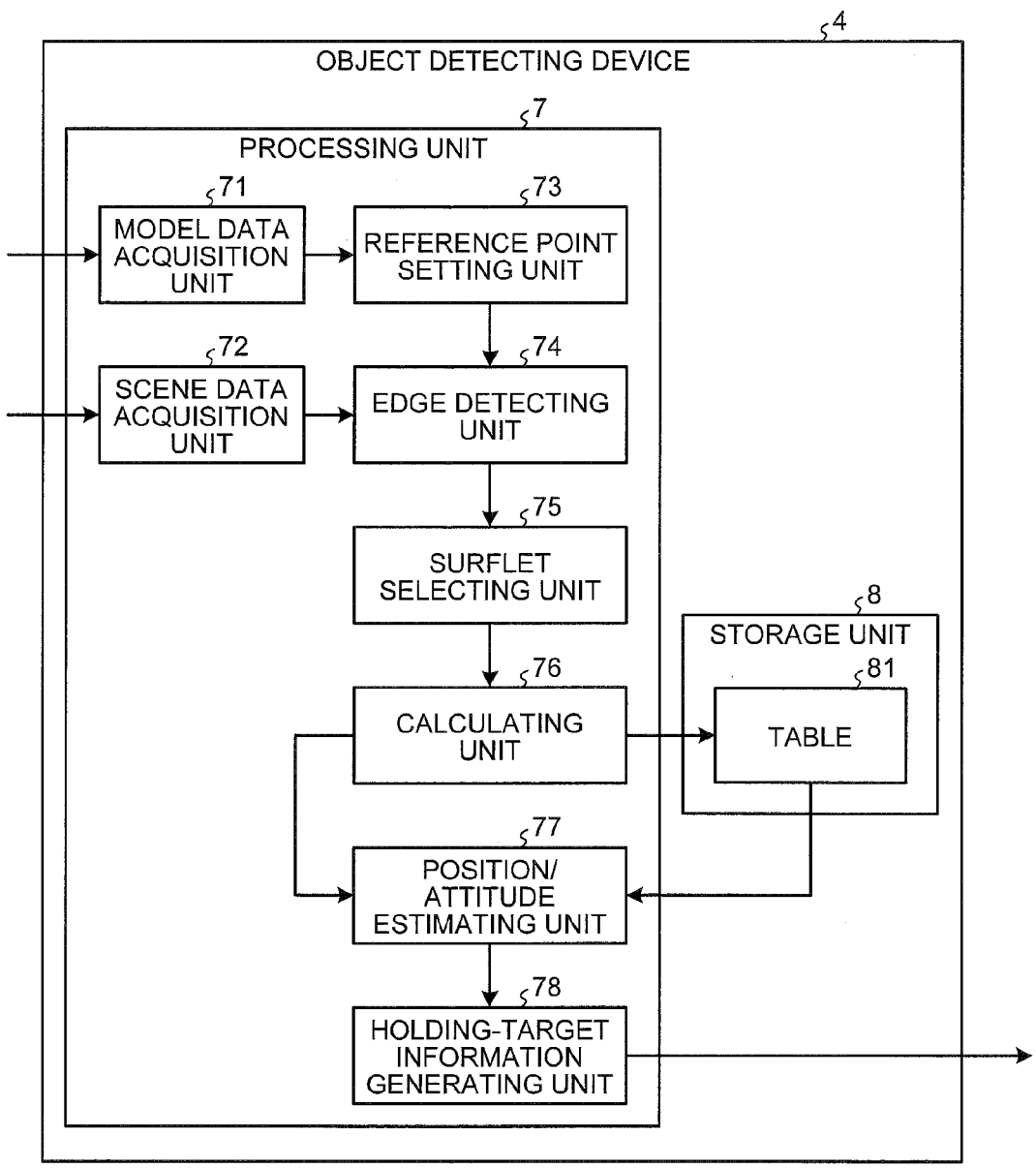
FIG. 3 is a diagram illustrating one example of configuration of an object detecting device according to the embodiment.

One example of configuration of the object detecting device 4 will now be described with reference to the FIG. 3. FIG. 3 is a diagram illustrating the example of configuration of the object detecting device 4 according to the embodiment. As depicted in FIG. 3, the object detecting device 4 includes a processing unit 7 and a storage unit 8. The storage unit 8 stores a table 81 described above. One example of the table 81 will described later with reference to FIG. 7.

The processing unit 7 includes a model data acquisition unit 71, a scene data acquisition unit 72, a reference point setting unit 73, an edge detecting unit 74, a surflet selecting unit 75, a calculating unit 76, a position/attitude estimating unit 77, and a holding-target information generating unit 78.

The object detecting device 4 causes the model data acquisition unit 71, the reference point setting unit 73, the edge detecting unit 74, the surflet selecting unit 75, and the calculating unit 76 to prepare the table 81 described above, and causes the storage unit 8 to store the table 81.

A procedure for preparing the table 81 by the object detecting device 4 and one example of the table 81 will now be described with reference to FIGS. 4A, 4B, 5A, 5B, 6, and 7 in combination. FIGS. 4A, 4B, 5A, 5B, and 6 are diagrams illustrating the procedure for preparing the table 81 according to the embodiment, and FIG. 7 is a diagram illustrating the example of the table 81 according to the embodiment.

Figure 4A:
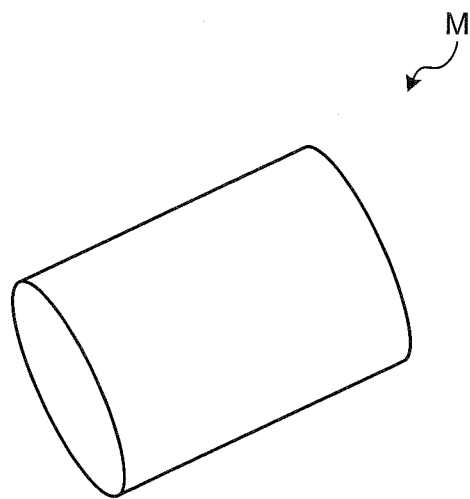
FIGS. 4A, 4B, 5A, 5B, and 6 are diagrams illustrating a procedure for preparing a table according to the embodiment.

The model data acquisition unit 71 reads CAD data of the model M depicted in FIG. 4A whose size and shape are the same as those of the object W to be held by the robot 2 from a predetermined information processing device (not depicted). The model data acquisition unit 71 then extracts and acquires model data indicating the surface shape of the model M from the CAD data.

Figure 4B:
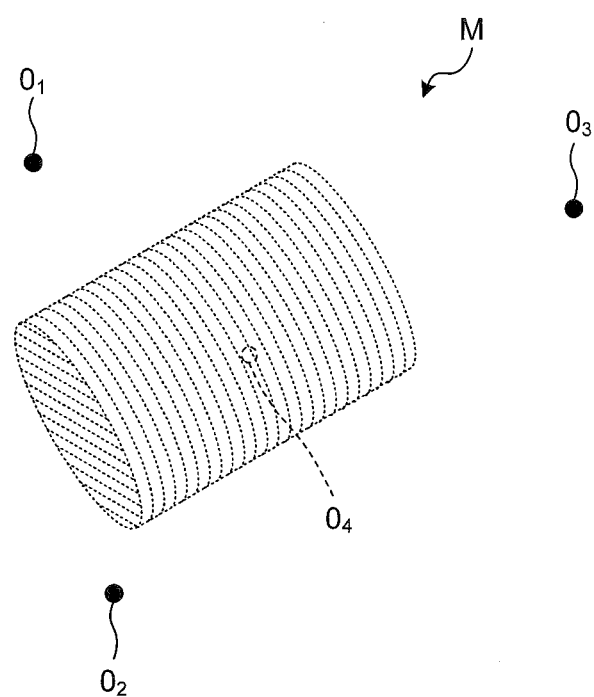

More specifically, the model data acquisition unit 71 acquires, as depicted in FIG. 4B, three-dimensional position information (position vector) in the real space for each point of a point group located on a surface of the model M and information of normal vectors with respect to the surface of the model M at each point, for example, as model data. The model data acquisition unit 71 then outputs the model data thus acquired to the reference point setting unit 73.

The reference point setting unit 73 sets three external reference points $O_1$, $O_2$, and $O_3$ in external space of the model M for the model data, and also sets an internal reference point $O_4$ in internal space of the model M as depicted in FIG. 4B. Herein, when the external reference points $O_1$, $O_2$, and $O_3$ and the internal reference point $O_4$ are not distinguished from each other, these are collectively referred to as reference points O. The reference point setting unit 73 outputs the model data provided with the reference points O to the edge detecting unit 74.

Figure 5A:
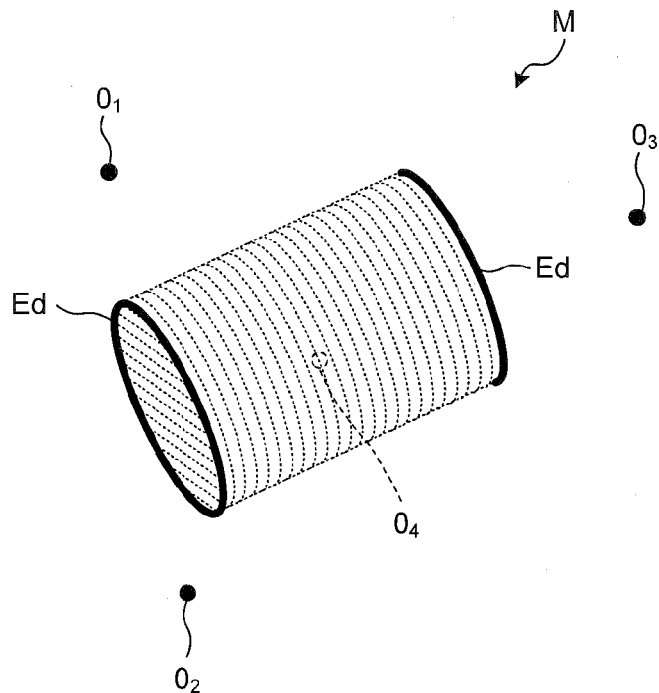
Figures 6, 7:
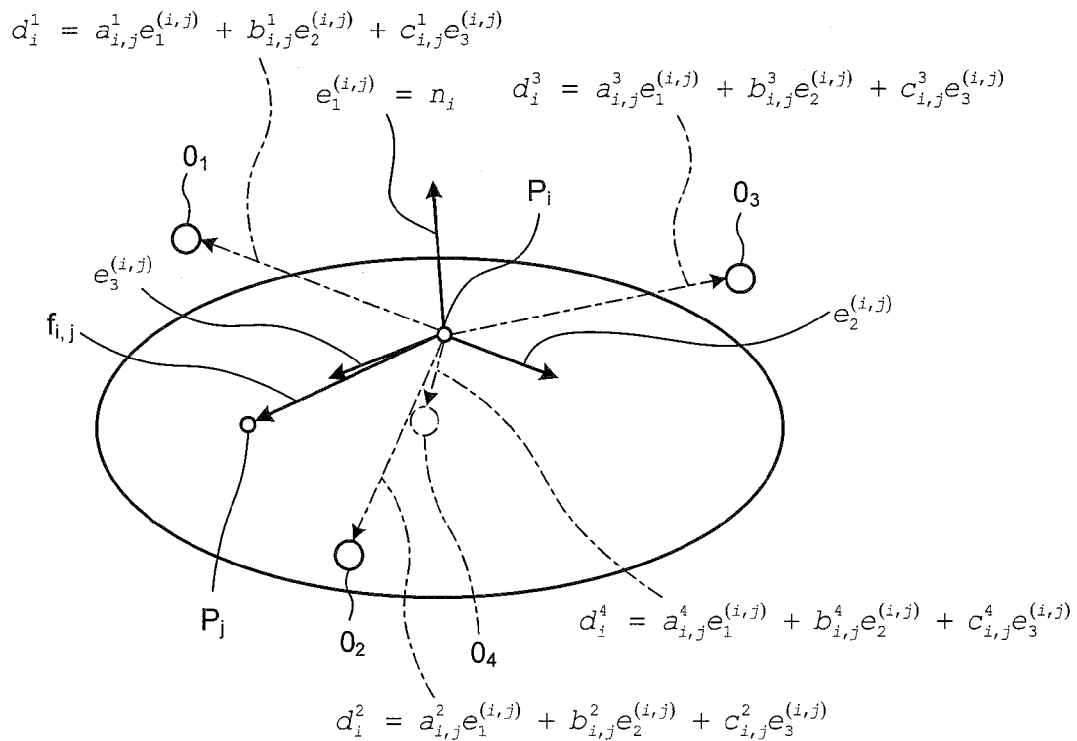
FIG. 7 is a diagram illustrating one example of the table according to the embodiment.

The edge detecting unit 74 detects edges Ed of the model M on the basis of the model data input from the reference point setting unit 73 as depicted in FIG. 5A. Furthermore, the edge detecting unit 74 adds, to a point group forming the edges Ed of the model M, information indicating that points thereof are on the edges Ed (hereinafter, referred to as "label E"). The edge detecting unit 74 also adds, to a point group forming a portion other than the edges Ed of the model M, information indicating that points thereof are on a face (hereinafter, referred to as "label F"). The edge detecting unit 74 then outputs the model data to which the label E and the label F are added to the surflet selecting unit 75.

The surflet selecting unit 75 sequentially selects pairs of two points located on the surface of the model M as a pair of a starting point $P_i$ and an endpoint $P_j$ from the model data input from the edge detecting unit 74 to acquire information on the points thus selected (hereinafter, referred to as "surflet").

Figure 5B:
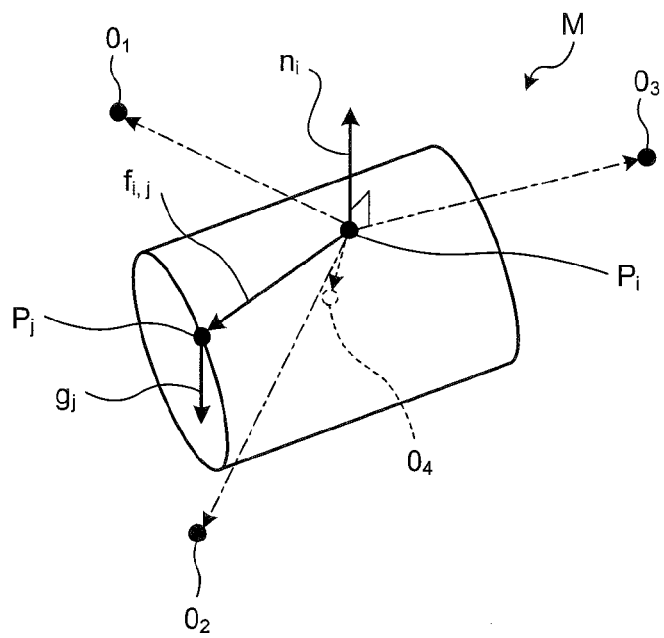

For example, when selecting the starting point $P_i$ located on the circumferential surface of the cylindrical model M as depicted in FIG. 5B, the surflet selecting unit 75 acquires a set of a position vector $p_i$, the label F, and a normal vector $n_i$ in the real space for the starting point $P_i$ as a surflet $\Delta(p_i)$ of the starting point $P_i$.

When selecting the endpoint $P_j$ located on an edge Ed of the model M (see FIG. 5A), the surflet selecting unit 75 acquires a set of a position vector $p_j$ in the real space for the endpoint $P_j$, the label E, and a gradient vector $g_j$ for the endpoint $P_j$ as a surflet $\Delta(p_j)$ of the endpoint $P_j$.

The gradient vector $g_j$ herein is an angle between the circumferential surface and an end surface of the model M at the endpoint $P_j$. When selecting a point on a face as an endpoint, the surflet selecting unit 75 acquires a set of the position vector of the endpoint, the label F, and the normal vector at the endpoint as a surflet of the endpoint.

The surflet selecting unit 75, while changing the starting point $P_i$ and the endpoint $P_j$ to be selected, acquires a plurality of pairs of the surflet $\Delta(p_i)$ and the surflet $\Delta(p_j)$ (hereinafter, referred to as "surflet pairs"), and outputs the surflet pairs to the calculating unit 76.

The surflet pairs are information used for, for example, a process in which the calculating unit 76 calculates feature quantities of a local surface of the model M including the pair of the starting point $P_i$ and the endpoint $P_j$. Accordingly, the surflet selecting unit 75 may be configured to select all points located on the surface of the model M as the starting point $P_i$ and the endpoint $P_j$ to acquire the surflet pairs, or may be configured to select points to which the label E is added or points to which the label F is added as the endpoint $P_j$.

With the configuration to select all points located on the surface of the model M as the starting point $P_i$ and the endpoint $P_j$, more feature quantities of a local surface in the model M can be stored in the table 81, whereby the accuracy of detecting the object W can be improved.

The configuration to exclusively select points to which the label E is added as the endpoint $P_j$ is effective when an area occupied by a plane portion is relatively large in a model. More specifically, in such a model in which a large area is occupied by a plane portion, selecting any points in the plane portion as the starting point $P_i$ and the endpoint $P_j$ makes little difference, and selecting the edge Ed portion as the endpoint $P_j$ can provide feature quantities that represent the features of the model more precisely. Furthermore, points on the face to which the label F is added can be excluded from candidates for the endpoint $P_j$, whereby the amount of processing for calculating the feature quantities can be reduced.

Consequently, with the configuration to exclusively select points to which the label E is added as the endpoint $P_j$, for a model in which a large area is occupied by a plane portion, the accuracy of detecting the position and the attitude of the object can be improved with a reduced amount of processing.

In contrast, the configuration to exclusively select points to which the label F is added as the endpoint $P_j$ is effective when an area occupied by a curved surface in a model is relatively large. More specifically, in such a model in which a large area is occupied by a curved surface, each of local planes on a face of the model has features of the model.

Consequently, with the configuration to exclusively select points to which the label F is added as the endpoint $P_j$, acquiring feature quantities for each of local planes on the model can improve the accuracy of detecting the position and the attitude of an object in which a large area is occupied by a curved portion.

The calculating unit 76 uses the surflet pairs input from the surflet selecting unit 75 to calculate feature quantities of local surfaces of the model M including the pair of the starting point $P_i$ and the endpoint $P_j$. For example, the calculating unit 76 calculates the following feature quantities: the distance between the starting point $P_i$ and the endpoint $P_j$; the inner product of a normal vector $n_i$ at the starting point $P_i$ and a normal vector $n_j$ at the endpoint $P_j$; and the inner product between the normal vector $n_i$ at the starting point $P_i$ and a vector $f_{i,j}$ connecting the starting point $P_i$ and the endpoint $P_j$.

Furthermore, the calculating unit 76 calculates a local coordinate system having the starting point $P_i$ as the origin to calculate position vectors of the reference points O in the local coordinate system (see dashed-dotted arrows depicted in FIG. 5B). To calculate the position vectors of the reference points O, a position vector $p_i$ of the starting point $P_i$, a position vector $p_j$ of the endpoint $P_j$, and a difference vector $f_{i,j}$ between the position vector $p_i$ and the position vector $p_j$ are used.

More specifically, the position vectors of the respective reference points O in the real space can be expressed by the following formula (1).

$$d_i^k = o_k - p_i (k=1,2,3,4) \quad (1)$$

The position vectors of the respective reference points O in the real space are expressed by using a local coordinate system defined by $\langle p_i, n_i, f_{i,j} \rangle$. The local coordinate system is defined as follows.

$$e_1^{(i,j)} = \frac{n_i}{\|n_i\|} \quad (2)$$

$$e_2^{(i,j)} = \frac{n_i \times f_{i,j}}{\|n_i \times f_{i,j}\|} \quad (3)$$

$$e_3^{(i,j)} = \frac{e_2^{(i,j)} \times n_i}{\|e_2^{(i,j)} \times n_i\|} \quad (4)$$

With orthogonal bases calculated by the above formulas (2), (3), and (4), the position vectors in the local coordinate system for the respective reference points O are calculated by the following formula (5).

$$d_{i,j}^k = a_{i,j}^k e_1^{(i,j)} + b_{i,j}^k e_2^{(i,j)} + c_{i,j}^k e_3^{(i,j)} \quad (5)$$

where each term in $\langle a_{i,j}^k, b_{i,j}^k, c_{i,j}^k; k=1,2,3,4 \rangle$ is a scalar, and the position vector $d_i^k$ can be calculated by the formula (5) when $\langle p_i, n_i, f_{i,j} \rangle$ is determined.

In this manner as depicted in FIG. 6, the respective position vectors (see dashed-dotted arrows depicted in FIG. 6) of the external reference points $O_1$, $O_2$, and $O_3$ and the internal reference point $O_4$ in the local coordinate system having the starting point $P_i$ as the origin are calculated.

Subsequently, the calculating unit 76 prepare the table 81 in which a feature quantity (H1, H2, etc.) of a local surface including the pair of starting point $P_i$ and the endpoint $P_j$ previously calculated and the set of position vectors of the reference points O (herein, four position vectors of the external reference points $O_1$, $O_2$, and $O_3$ and the internal reference point $O_4$) in a local coordinate system having the starting point $P_i$ as the origin are associated as depicted in FIG. 7.

The model M has a plurality of local surfaces whose feature quantities are the same. Accordingly, in the table 81, a plurality of sets of the reference points O in the local coordinate system each are associated with one feature quantity (H1, H2, etc.), that is, the table 81 has a data structure of a hash table containing each feature quantity (H1, H2, etc.) as a key. The calculating unit 76 causes the storage unit 8 to store the table 81 thus formed.

The object detecting device 4 estimates and detects the position and the attitude of the object W with the scene data acquisition unit 72, the edge detecting unit 74, the surflet selecting unit 75, the calculating unit 76, the position/attitude estimating unit 77, and the holding-target information generating unit 78.

One example of a procedure by which the object detecting device 4 detects the position and the attitude of the object W will now be described with reference to FIGS. 8A, 8B, 9, and 10 in combination. FIGS. 8A, 8B, 9, and 10 are diagrams illustrating a procedure for detecting the position and the attitude of the object W according to the embodiment.

Figure 8A:
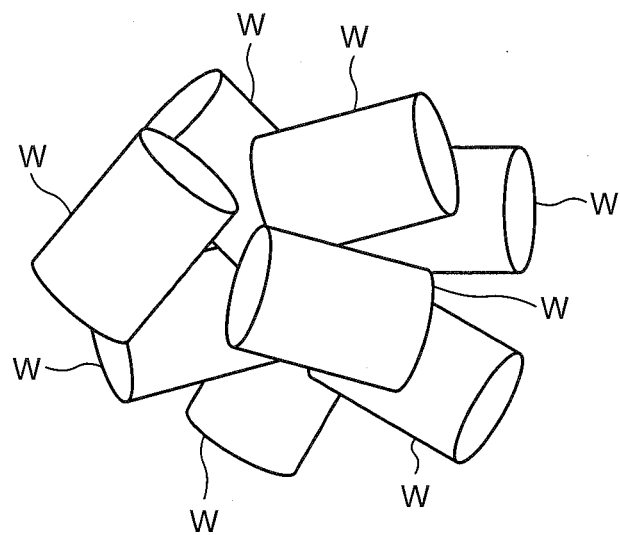
FIGS. 8A, 8B, 9, and 10 are diagrams illustrating a procedure for detecting the position and the attitude of an object according to the embodiment.
Figure 8B:
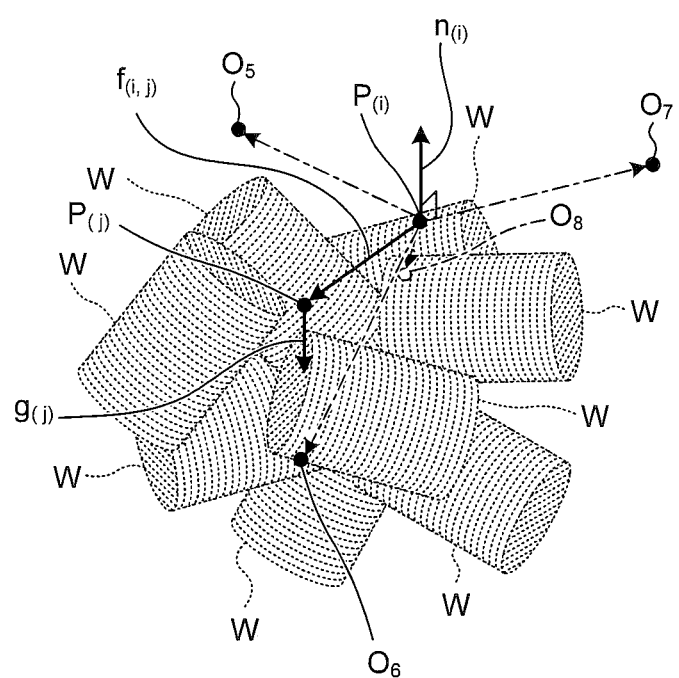

The scene data acquisition unit 72 acquires scene data indicating the three-dimensional shape of objects W stored in bulk as depicted in FIG. 8A from the sensor 3. More specifically, the scene data acquisition unit 72 acquires three-dimensional position information (position vector) in the real space for each point of a sample point group located on a surface of an object W and information of a normal vector $n_{(i)}$ with respect to the surface of the object W for each point, for example, as depicted in FIG. 8B as scene data. The scene data acquisition unit 72 then outputs the scene data thus acquired to the edge detecting unit 74.

The edge detecting unit 74 detects edges of the object W on the basis of the scene data input from the scene data acquisition unit 72. Furthermore, the edge detecting unit 74 adds, to a sample point group forming the edges of the object W, the label E indicating that points thereof are on the edges, and calculate a gradient vector $g_{(i)}$ of each sample point to which the label E is added.

The edge detecting unit 74 also adds, to a sample point group forming a portion other than the edges of the object W, the label F indicating that points thereof are on a face. The edge detecting unit 74 then outputs model data to which the label E and the label F are added to the surflet selecting unit 75. The edge detecting unit 74 also outputs the gradient vector $g_{(j)}$ of each sample point on the edges to the surflet selecting unit 75.

The surflet selecting unit 75 sequentially selects a pair of two points located on a surface of the object W as a pair of a starting point $P_{(i)}$ and an endpoint $P_{(j)}$, and acquires surflets on the sample points thus selected.

For example, when selecting the starting point $P_{(i)}$ located on the circumferential surface of the cylindrical object W, the surflet selecting unit 75 acquires a set of a position vector $p_{(i)}$, the label F, and a normal vector $n_{(i)}$ in the real space for the starting point $P_{(i)}$ as a surflet $\Delta(p_i)$ of the starting point $P_{(i)}$.

When selecting the endpoint $P_{(j)}$ located on an edge of the object W, the surflet selecting unit 75 acquires a position vector $p_{(j)}$ in the real space for the endpoint $P_{(j)}$, the label E, and a gradient vector $g_{(j)}$ of the endpoint $P_{(j)}$ as a surflet $\Delta(p_j)$ of the endpoint $P_{(j)}$.

The gradient vector $g_{(j)}$ herein is an angle between the circumferential surface and an end surface of the object W at the endpoint $P_{(j)}$. When selecting a point on a face as an endpoint, the surflet selecting unit 75 acquires a set of the position vector of the endpoint, the label F, and the normal vector at the endpoint as a surflet of the endpoint.

The surflet selecting unit 75, while changing the starting point $P_{(i)}$ and the endpoint $P_{(j)}$ to be selected, acquires surflet pairs that are a plurality of pairs of the surflet $\Delta(p_i)$ and the surflet $\Delta(p_j)$, and outputs the surflet pairs to the calculating unit 76.

The surflet pairs are information used for, for example, a process in which the calculating unit 76 calculates feature quantities of a local surface of the object W including the pair of the starting point $P_{(i)}$ and the endpoint $P_{(j)}$. Accordingly, similarly to the case of acquiring the surflet pairs of the model M, by selecting all points as the starting point $P_{(i)}$ and the endpoint $P_{(j)}$ to acquire the surflet pairs, the accuracy of detecting the object W can be improved.

In addition, the surflet selecting unit 75 exclusively selects the endpoint $P_j$ to which the label E is added, whereby the accuracy of detecting the position and the attitude of the object can be improved with a reduced amount of processing for an object in which a large area is occupied by a plane portion. In contrast, the surflet selecting unit 75 exclusively selects the $P_j$ to which the label F is added, whereby the accuracy of detecting the position and the attitude of the object can be improved for an object in which a large area is occupied by a curved surface.

The calculating unit 76 uses the surflet pairs input from the surflet selecting unit 75 to calculate feature quantities of local surfaces of the object W including the pair of the starting point $P_{(i)}$ and the endpoint $P_{(j)}$. For example, the calculating unit 76 calculates the following feature quantities: the distance between the starting point $P_{(i)}$ and the endpoint $P_{(j)}$; the inner product of a normal vector $n_{(i)}$ at the starting point $P_{(i)}$ and a normal vector $n_{(j)}$ at the endpoint $P_{(j)}$; and the inner product between the normal vector $n_{(i)}$ at the starting point $P_{(i)}$ and a vector $f_{(i,j)}$ connecting the starting point $P_{(i)}$ and the endpoint $P_{(j)}$. The calculating unit 76 then outputs the surflet pairs used to calculate the feature quantities and the feature quantities of local surfaces of the object W calculated to the position/attitude estimating unit 77.

The position/attitude estimating unit 77 acquires from the table 81 a plurality of sets of position vectors of the reference points O with which feature quantities matching the feature quantities of local surfaces of the object W input from the calculating unit 76 are associated. Furthermore, the position/attitude estimating unit 77 calculates a local coordinate system having the starting point $P_{(i)}$ as the origin. The position/attitude estimating unit 77 then transforms the sets of position vectors acquired from the table 81 into sets of position vectors in the local coordinate system having the starting point $P_{(i)}$ as the origin by the following formula (6).

$$\hat{d}_{i,j}^k = a_{i,j}^k \hat{e}_1^{(i,j)} + b_{i,j}^k \hat{e}_2^{(i,j)} + c_{i,j}^k \hat{e}_3^{(i,j)} \quad (6)$$

where $\hat{e}_k^{(i,j)}$ (k=1,2,3,4) is obtained by the formulas (2) to (4) on the basis of $n_{(i)}$ and $f_{(i,j)}$.

Subsequently, the position/attitude estimating unit 77 transforms the sets of transformed position vectors in the local coordinate system having the starting point $P_{(i)}$ as the origin into sets of position vectors in the real space by the following formula (7).

$$\hat{q}_{i,j}^k = p_{(i)} + \hat{d}_{i,j}^k (k=1,2,3,4) \quad (7)$$

Figure 9:
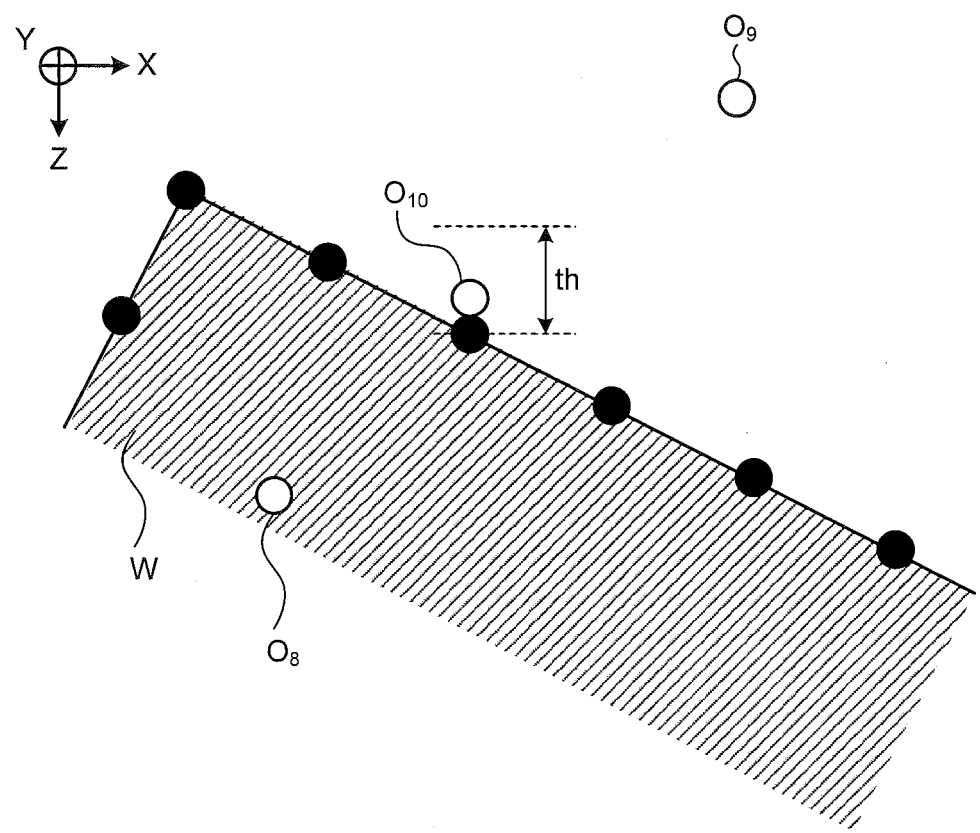

In this manner, as indicated by dashed-dotted lines in FIG. 8B, position vectors in the real space for external reference points $O_5$, $O_6$, and $O_7$ and an internal reference point $O_8$ are calculated. Herein, the position/attitude estimating unit 77 determines whether the external reference points $O_5$, $O_6$, and $O_7$ are valid based on the positional relation between sample points on the surface of the object W indicated by filled circles and the internal reference point $O_8$ indicated by open circles as depicted in FIG. 9. The X-axis and Y-axis depicted in FIG. 9 are orthogonal vectors located on a plane parallel to the horizontal plane, and the Z-axis is orthogonal to the XY plane and the positive direction thereof is the vertical downward direction.

When the internal reference point $O_8$ is inside the object W as depicted in FIG. 9, the position/attitude estimating unit 77 determines that the position vectors of the external reference points $O_5$, $O_6$, and $O_7$ in the same set as that of the position vector of the internal reference point $O_8$ are appropriate reference points as information for estimating the position and the attitude of the object W.

In contrast, when the internal reference point is outside the object W as depicted as the internal reference point $O_9$, the position/attitude estimating unit 77 determines that the external reference points in the same set as that of the position vector of the internal reference point $O_9$ are inappropriate reference points as information for estimating the position and the attitude of the object W to exclude these external reference points from information for estimation.

More specifically, assuming that the coordinate value in the real space for the internal reference point $O_8$ is $(x_k, y_k, z_k)$, the position/attitude estimating unit 77 verifies whether the internal reference point $O_8$ is inside the object W by the following formula (8) to determine whether the external reference points $O_5$, $O_6$, and $O_7$ are valid.

$$\bigcap_{k=1}^{s}(z_k - scanZ(x_k, y_k \geq -th)) = \text{true} \quad (8)$$

Herein, scanZ(x,y) in the above formula (8) is a z-coordinate value of a sample point whose x-coordinate value and y-coordinate value in the real space match the x-coordinate value and the y-coordinate value of the internal reference point $O_8$.

In this manner, the position/attitude estimating unit 77 excludes reference points O that are inappropriate as information for estimating the position and the attitude of the object W from the information for estimating the position and the attitude of the object W. Accordingly, the position/attitude estimating unit 77 can improve the accuracy of estimating the position and the attitude of the object W while reducing the amount of processing for casting votes for the external reference points $O_5$, $O_6$, and $O_7$ performed later.

Although the internal reference point $O_4$ is set in the internal space of the model M in the present embodiment, the internal reference point $O_4$ may be set on the surface of the model M, for example, other than the internal space of the model M. However, in this case, if whether the internal reference point $O_{10}$ corresponding to the internal reference point $O_4$ is on the surface of the object W is assumed to be a validity criterion for the external reference points $O_5$, $O_6$, and $O_7$, the validity criterion may be so severe that the appropriate reference points O can be mistakenly determined to be inappropriate.

In view of this, in the position/attitude estimating unit 77, a certain threshold th is set in the above formula (8) and a certain margin is kept in the validity criterion for the external reference points $O_5$, $O_6$, and $O_7$, whereby occurrence of misjudgment in which appropriate reference points are determined to be inappropriate is suppressed.

Subsequently, the position/attitude estimating unit 77 performs a process of casting votes for respective voting points in the real space that match the positions in the real space for the external reference points $O_5$, $O_6$, and $O_7$ that are determined to be appropriate as information for determining the position and the attitude of the object W.

Figure 10:
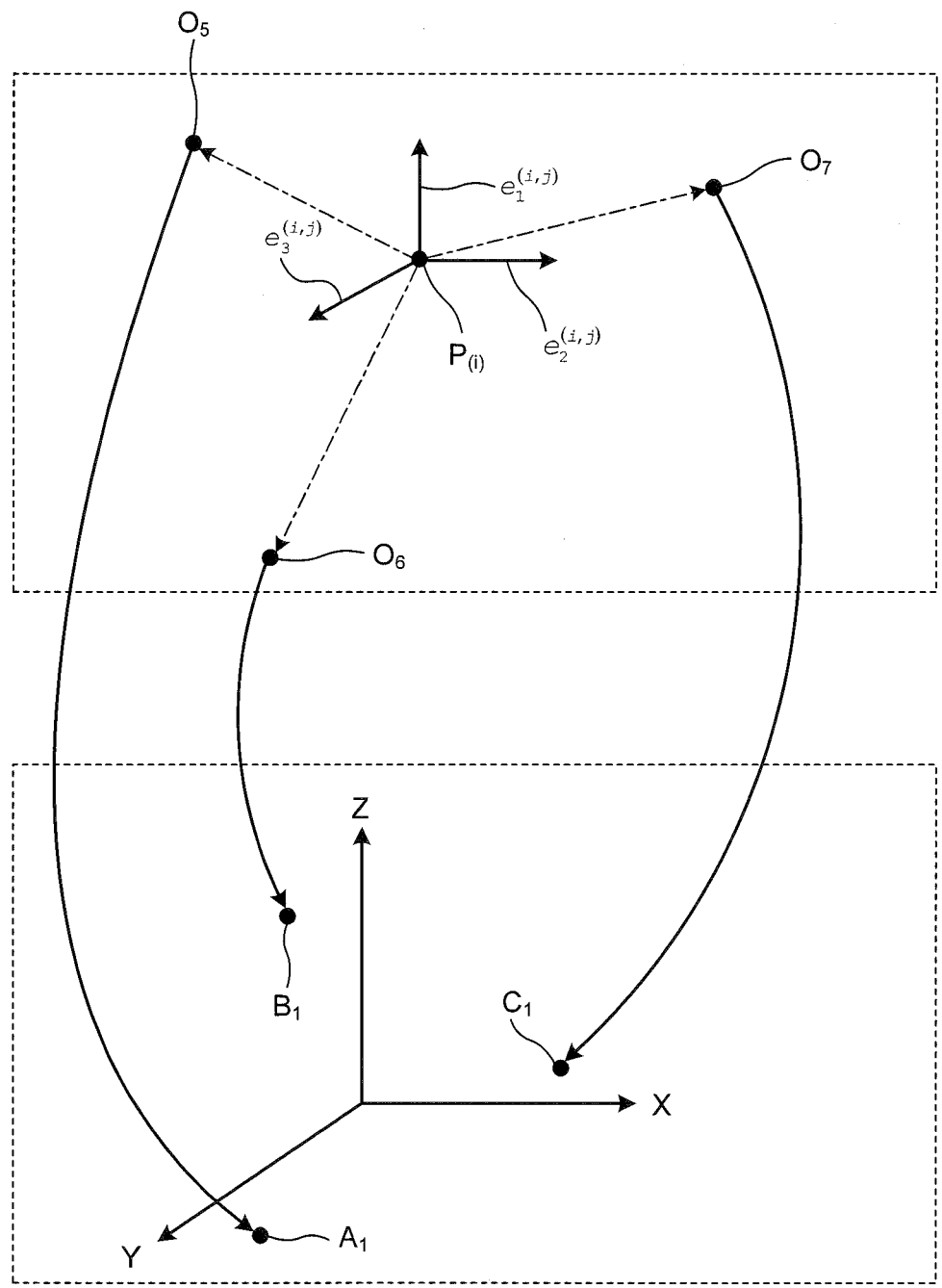

For example, the position/attitude estimating unit 77 casts votes for three points $A_1$, $B_1$, and $C_1$ in the real space depicted in the lower diagram of FIG. 10 corresponding to the external reference points $O_5$, $O_6$, and $O_7$, respectively, in the local coordinate having the starting point $P_{(i)}$ as the origin depicted in the upper diagram of FIG. 10. With respect to all external reference points that are determined to be appropriate as information for estimation, the position/attitude estimating unit 77 sequentially casts votes in the real space.

Accordingly, the number of votes obtained for the set of three voting points $A_1$, $B_1$, and $C_1$ depicted in FIG. 10, for example, gradually increases. In the real space, with respect to voting points other than these three points $A_1$, $B_1$, and $C_1$ also, votes are sequentially cast for respective sets of other three voting points in the real space, for each set of three external reference points. The position/attitude estimating unit 77 monitors the number of votes obtained for the respective voting points, for each set of these three voting points.

When votes are cast for voting points in a nine-dimensional space in which one point is determined by respective x-, y-, and z-coordinate values of respective external reference points in each set of three external reference points, i.e., nine coordinate values, for example, external reference points that are most probable can be detected based on voting points obtaining the largest number of votes. However, in this case, voting space becomes enormous, and thus the amount of calculation required for the voting becomes enormous.

In view of this, the position/attitude estimating unit 77 casts votes for each set of three voting points independent in the three-dimensional real space that correspond to the positions of the respective external reference points in each set of three external reference points. Accordingly, the amount of calculation required for the voting can be significantly reduced. However, in the position/attitude estimating unit 77, what is called an interference phenomenon occurs in which, among three votes that should be originally cast for one set of three voting points, any one vote is cast for another set of voting points.

Hence, when the number of votes for a voting point that obtains the smallest number of votes obtained has reached a certain threshold Vth among respective voting points in sets of three voting points, the position/attitude estimating unit 77 lists the sets of three voting points. The position/attitude estimating unit 77 then sums up the number of total votes obtained for each set of three voting points thus listed, and estimates the position and the attitude of the object W in order from the set obtaining the largest number of votes on the basis of the positions in the real space for voting points in the set.

For example, when the number of votes obtained for the point $A_1$ is smallest among the set of three points $A_1$, $B_1$, and $C_1$ depicted in FIG. 10 and the number of votes obtained for the $A_1$ has reached the threshold Vth, the position/attitude estimating unit 77 lists the set of three points $A_1$, $B_1$, and $C_1$. Accordingly, for example, even if the numbers of votes obtained for the two points $B_1$ and $C_1$ increase, unless the number of votes obtained for the point $A_1$ has reached the threshold Vth, the set of three points $A_1$, $B_1$, and $C_1$ validity of which is not determined yet can be prevented from being prematurely determined to be a set of appropriate voting points.

Subsequently, the position/attitude estimating unit 77 outputs information indicating the positions and the attitudes of a plurality of objects W estimated to the holding-target information generating unit 78. The holding-target information generating unit 78 determines whether an object W that can be a candidate to be held by the robot 2 is present. When a candidate to be held is present, the holding-target information generating unit 78 outputs information indicating the position and the attitude of the candidate to be held to the robot control device 5. When no candidate to be held is present, the holding-target information generating unit 78 outputs information indicating absence of a candidate to the robot control device 5.

Figure 11:
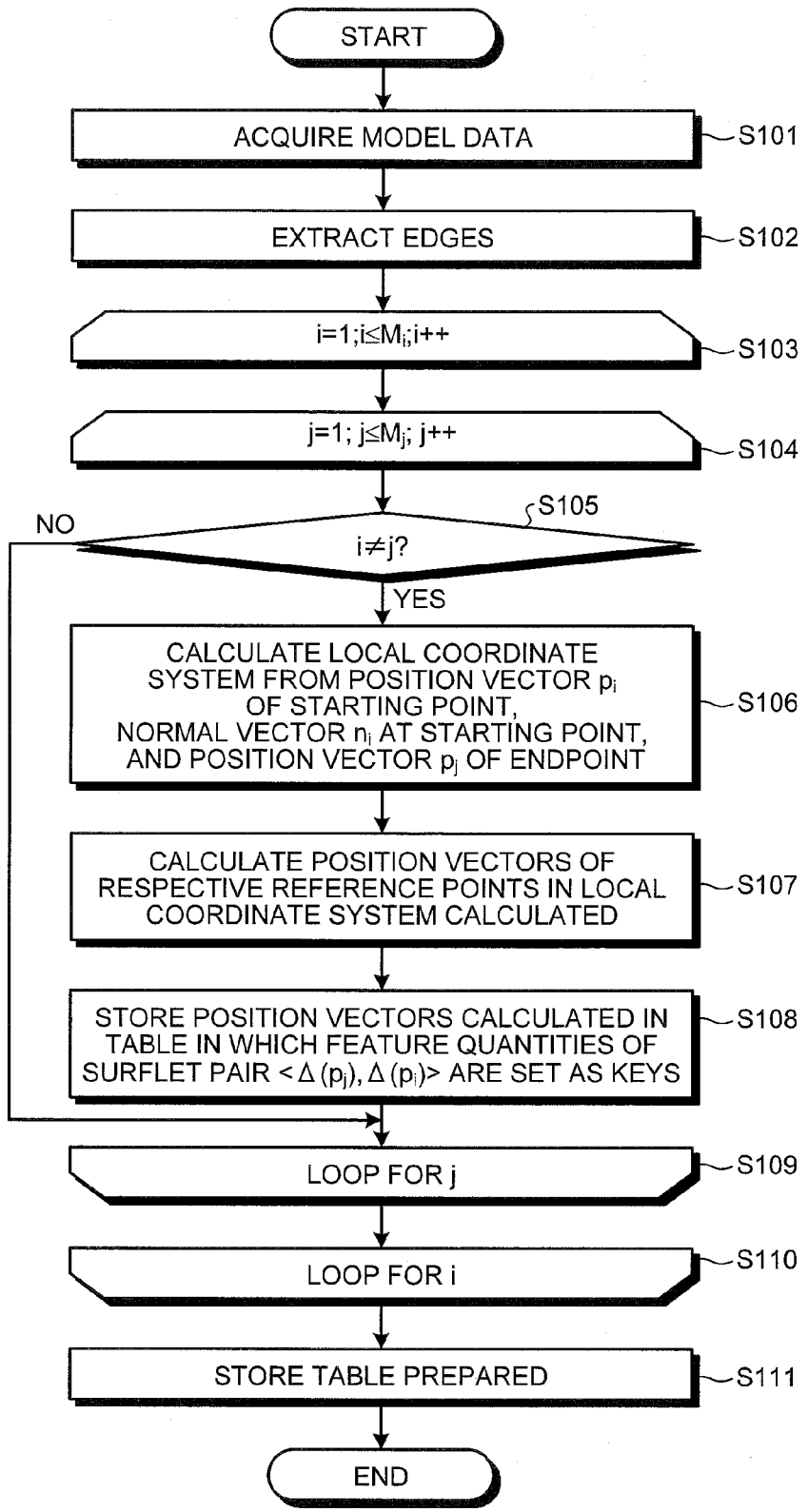
FIG. 11 is a flowchart illustrating a process of preparing a table according to the embodiment.
Figure 12:
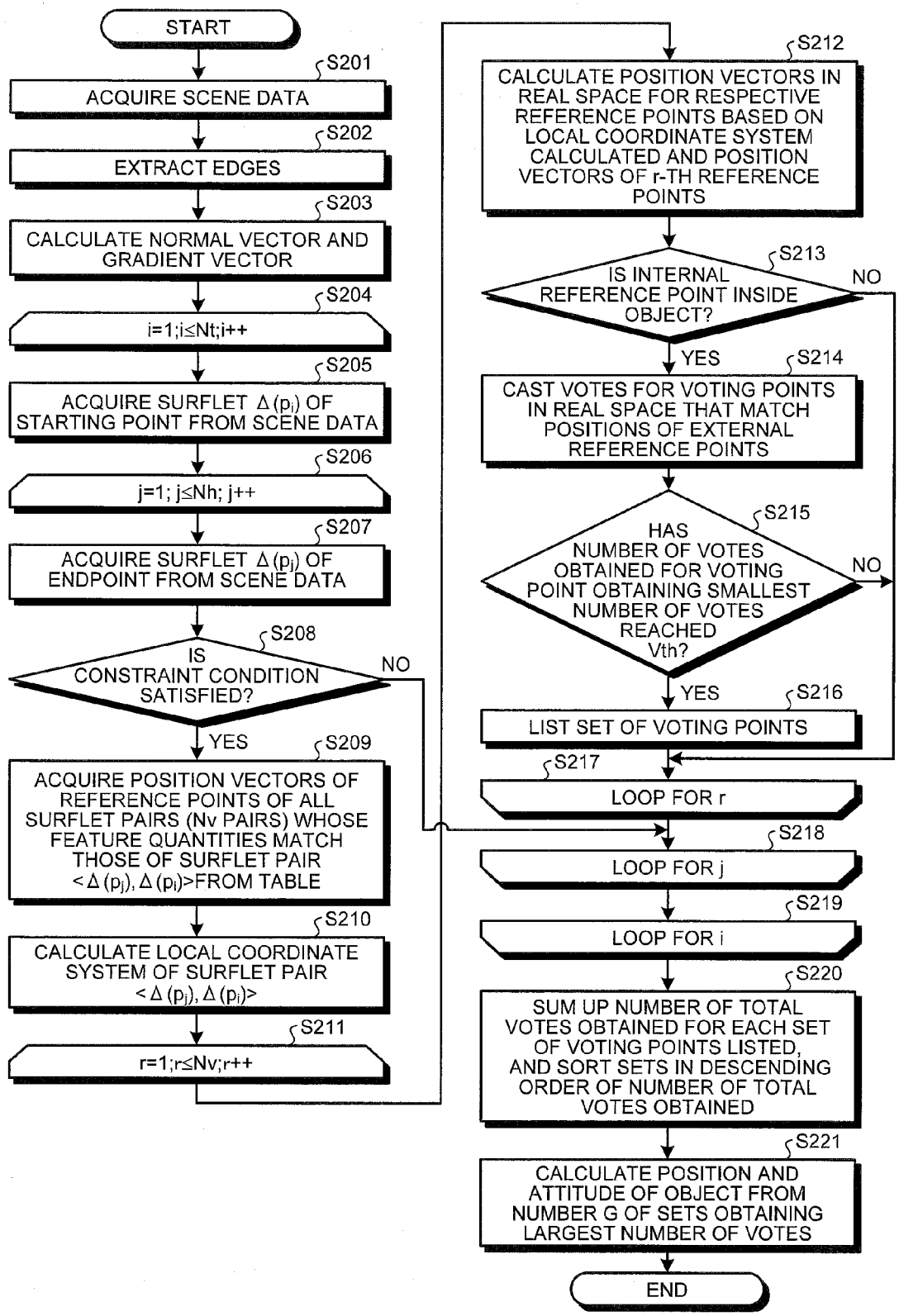
FIG. 12 is a flowchart illustrating a process of detecting the positions and the attitudes of objects according to the embodiment.
Figure 13:
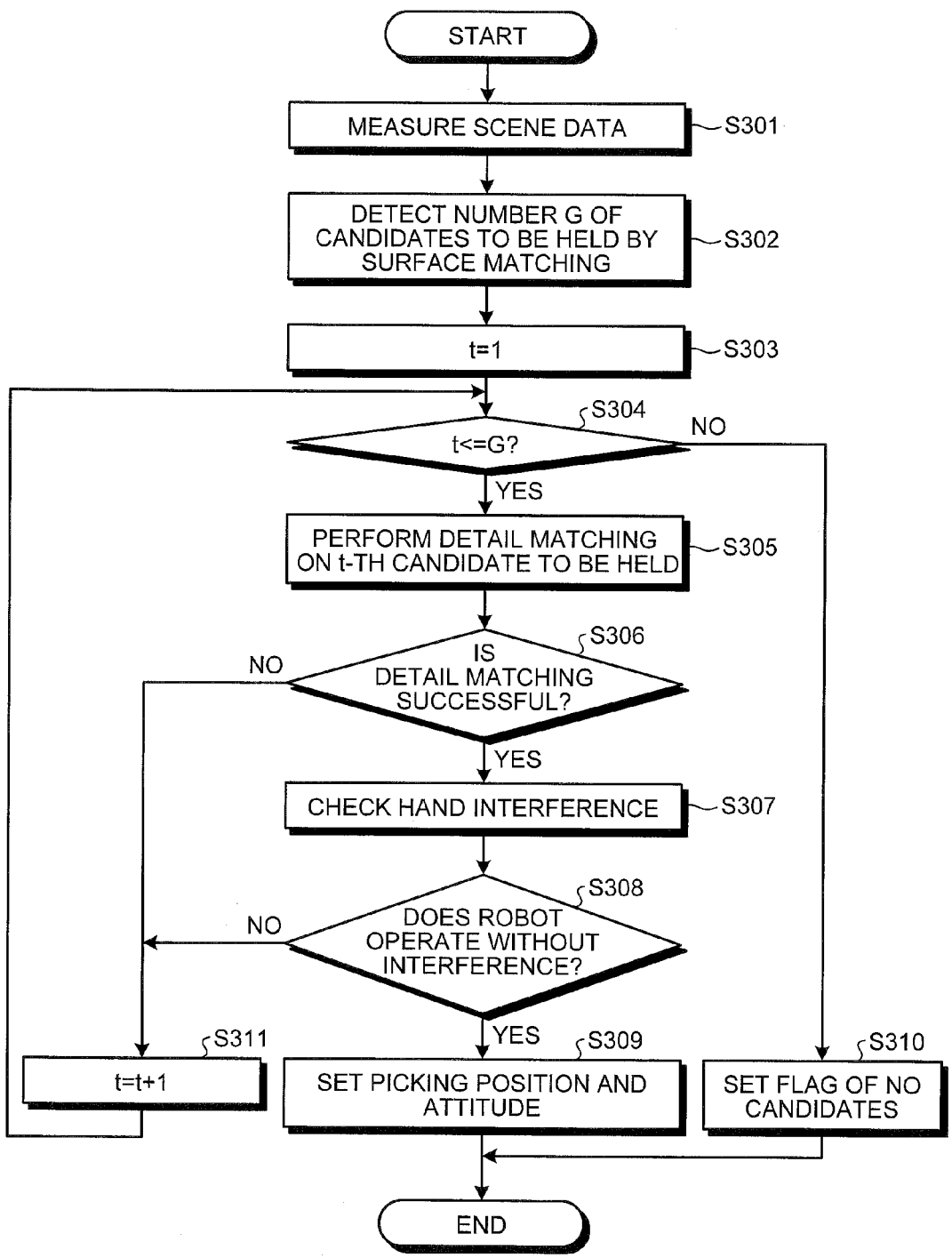
FIG. 13 is a flowchart illustrating a process of preparing information on candidates to be held according to the embodiment.

A process performed by the processing unit 7 of the object detecting device 4 will be described below with reference to FIGS. 11, 12, and 13. FIG. 11 is a flowchart illustrating a process of preparing the table 81 according to the embodiment. FIG. 12 is a flowchart illustrating a process of detecting the positions and the attitudes of objects W according to the embodiment. FIG. 13 is a flowchart illustrating a process of preparing information on candidates to be held according to the embodiment.

The processing unit 7 of the object detecting device 4 prepares the table 81 by performing the process depicted in FIG. 11 in advance before detecting the position and the attitude of an object W. More specifically, the processing unit 7 acquires model data first (step S101), and extracts edges Ed of the model M from the model data (step S102).

Subsequently, the processing unit 7 sets a variable i that corresponds to a position on a surface of the model M for a starting point $P_i$ selected from the surface of the model M to one (step S103). The processing unit 7 then sets a variable j that corresponds to a position on the surface of the model M for an endpoint $P_j$ selected from the surface of the model M to one (step S104).

Subsequently, the processing unit 7 determines whether the value of the variable i is unequal to the value of the variable j (step S105), that is, the processing unit 7 determines whether the starting point $P_i$ and the endpoint $P_j$ selected from the surface of the model M are the same point. Herein, both the value of the variable i and the value of the variable j are one. Accordingly, the processing unit 7 determines that the starting point $P_i$ and the endpoint $P_j$ are the same point (No at step S105), and moves on to the process at step S109.

At step S109, the processing unit 7 performs the process at the beginning of a loop for the variable j, i.e., step S104. At step S104, the processing unit 7 adds one to the value of the variable j, and moves on to the process at step S105. Hereinafter, every time the process proceeds to step S109, the processing unit 7 adds one to the variable j at step S104 and moves on to the process at step S110 when the process proceeds to step S109 after the value of the variable j has reached $M_j$. That is, the processing unit 7 selects a number $M_j$ of endpoints $P_j$ from the surface of the model M.

When determining that the value of the variable i is unequal to the value of the variable j (Yes at step S105), the processing unit 7 moves on to the process at step S106. At step S106, the processing unit 7 calculates a local coordinate system having the starting point $P_i$ as the origin from the position vector $p_i$ of the starting point $P_i$, the normal vector $n_i$ at the starting point $P_i$, and the position vector $p_j$ of the endpoint $P_j$.

Subsequently, the processing unit 7 calculates the position vectors of respective reference points O in the local coordinate system thus calculated (step S107). The processing unit 7 also calculates feature quantities of a surflet pair $<\Delta(p_j)$, $\Delta(p_i)>$ that are feature quantities of the local surface of the model M including the starting point $p_i$ and the endpoint $P_j$.

Subsequently, the processing unit 7 stores the position vectors of the reference points O calculated in the table 81 in which the feature quantities of the surflet pair $<\Delta(p_j), \Delta(p_i)>$ are set as keys (step S108), and moves on to the process at step S109. The processing unit 7 then repeats processes of step S104 to step S109 for one starting point $P_i$ and a number $M_j$ of endpoints $P_j$, and then moves on to the process at step S110.

At step S110, the processing unit 7 performs the process at the beginning of a loop for the variable i, i.e., step S103. At step S103, the processing unit 7 adds one to the variable i, and moves on to the process at step S104. Hereinafter, every time the process proceeds to step S110, the processing unit 7 adds one to the variable i at step S103 and moves on to the process at step S111 when the process proceeds to step S110 after the value of the variable i has reached $M_i$.

In other words, the processing unit 7 selects a number $M_i$ of starting points $P_i$ from the surface of the model M, repeats processes of step S103 to step 110 for each of a number $M_i$ of starting points $P_i$ and a number $M_j$ of endpoints $P_j$, and moves on to the process at step S111. The processing unit 7 finally stores the table 81 prepared in the storage unit 8, and ends the process.

The table 81 may be prepared by a device other than the object detecting device 4. In this case, the object detecting device 4 acquires the table 81 prepared from the other device, and stores the table 81 in the storage unit 8.

The processing unit 7 also performs surface matching for detecting the positions and the attitudes of objects W by performing the process depicted in FIG. 12. More specifically, the processing unit 7 acquires scene data of objects W stored in bulk from the sensor 3 first (step S201), and extracts edges of each of the objects W from the scene data (step S202).

Subsequently, the processing unit 7 calculates normal vectors of respective sample points from the scene data. The processing unit 7 also calculates gradient vectors for sample points forming the edges (step S203). Subsequently, the processing unit 7 sets a variable i that corresponds to a position on a surface of the object W for a starting point $P_{(i)}$ selected from the surface of the object W to one (step S204), and acquires a surflet $\Delta(p_i)$ of the starting point $P_{(i)}$ from the scene data (step S205).

Subsequently, the processing unit 7 sets a variable j that corresponds to a position on the surface of the object W for an endpoint $P_{(j)}$ selected from the surface of the object W to one (step S206), and acquires a surflet $\Delta(p_j)$ of the endpoint $P_{(j)}$ from the scene data (step S207).

Subsequently, the processing unit 7 determines whether the surflet pair $<\Delta(p_j), \Delta(p_i)>$ thus acquired satisfies a constraint condition (step S208). For example, in the case that both the starting point $P_{(i)}$ and the endpoint $P_{(j)}$ are points on a face, the processing unit 7 determines that the constraint condition is satisfied when the angle between the normal vector $n_{(i)}$ at the starting point $P_{(i)}$ and the normal vector $n_{(j)}$ at the endpoint $P_{(j)}$ is larger than a certain threshold $T_f$. The processing unit 7 determines that the constraint condition is not satisfied when the angle between the normal vector $n_{(i)}$ at the starting point $P_{(i)}$ and the normal vector $n_{(j)}$ at the endpoint $P_{(j)}$ is equal to or smaller than the certain threshold $T_f$.

Furthermore, for example, in the case that the starting point $P_{(i)}$ is a point on a face and the endpoint $P_{(j)}$ is a point on an edge, the processing unit 7 determines that the constraint condition is satisfied when the angle between the normal vector $n_{(i)}$ at the starting point $P_{(i)}$ and the gradient vector $g_{(j)}$ of the endpoint $P_{(j)}$ is larger than a certain threshold $T_e$. The processing unit 7 determines that the constraint condition is not satisfied when the angle between the normal vector $n_{(i)}$ at the starting point $P_{(i)}$ and the gradient vector $g_{(j)}$ of the endpoint $P_{(j)}$ is equal to or smaller than the certain threshold $T_e$.

By setting such a constraint condition, the processing unit 7 can be prevented from uselessly acquiring the surflet pair $<\Delta(p_j), \Delta(p_i)>$ for a pair of a starting point $P_{(i)}$ and an endpoint $P_{(j)}$ whose distinctive features are not likely to appear, and thus can reduce the amount of processing.

When determining that the surflet pair $<\Delta(p_j), \Delta(p_i)>$ acquired satisfies the constraint condition (Yes at step 208), the processing unit 7 moves on to the process at step S209. When determining that the surflet pair $<\Delta(p_j), \Delta(p_i)>$ acquired does not satisfy the constraint condition (No at step 208), the processing unit 7 moves on to the process at step S218.

At step S209, the processing unit 7 acquires, from the table 81, sets of position vectors of reference points O of all surflet pairs (Nv pairs) whose feature quantities match those of the surflet pair $<\Delta(p_j), \Delta(p_i)>$ acquired at step S205 and step S207.

Subsequently, the processing unit 7 calculates a local coordinate system of the surflet pair $<\Delta(p_j), \Delta(p_i)>$ acquired at step S205 and step S207 (step S210), that is, the processing unit 7 calculates a local coordinate system having the starting point $P_{(i)}$ as the origin on the basis of the surflet pair $<\Delta(p_j), \Delta(p_i)>$.

The processing unit 7 then sets a variable r that indicates the acquisition order of the sets of position vectors acquired at step S209 to one (step S211). Subsequently, the processing unit 7 calculates sets of position vectors in the real space for respective reference points O on the basis of the local coordinate system calculated at step S210 and the set of position vectors of the r-th reference points O (step S212).

The processing unit 7 determines whether the internal reference point $O_8$ is inside the object W (step S213). When determining that the internal reference point $O_8$ is inside the object W (Yes at step S213), the processing unit 7 moves on to the process at step S214. When determining that the internal reference point $O_8$ is outside the object W (No at step S213), the processing unit 7 moves on to the process at step S217.

At step S214, the processing unit 7 casts votes for voting points in the real space that match the position vectors of the external reference points $O_5$, $O_6$, and $O_7$ in the same set as that of the internal reference point $O_8$ that is determined to be inside the object W at step S213. The processing unit 7 then determines whether the number of votes obtained for a voting point that obtains the smallest number of votes among the set of three voting points for which votes are cast at step S214 has reached the threshold Vth (step S215).

When determining that the number of votes obtained has reached the threshold Vth (Yes at step S215), the processing unit 7 moves on to the process at step S216, lists the set of three voting points for which votes are cast at step S214 (step S216), and moves on to the process at step S217. When determining that the number of votes obtained has not reached the threshold Vth (No at step S215), the processing unit 7 moves on to the process at step S217.

At step S217, the processing unit 7 performs the process at the beginning of a loop for the variable r, i.e., step S211. At step S211, the processing unit 7 adds one to the value of the variable r. Hereinafter, every time the process proceeds to step S217, the processing unit 7 adds one to the value of the variable r at step S211, and when the process proceeds to step S217 after the value of the variable r has reached Nv, moves on to the process at step S218, that is, the processing unit 7 performs processes of step S212 to step S216 on all sets of position vectors of reference points O acquired at step S209.

At step S218, the processing unit 7 performs the process at the beginning of a loop for a variable j, i.e., step S206. At step S206, the processing unit 7 adds one to the value of the variable j. Hereinafter, every time the process proceeds to step S218, the processing unit 7 adds one to the value of the variable j at step S206 and moves on to the process at step S219 when the process proceeds to step S218 after the value of the variable j has reached Nh.

At step S219, the processing unit 7 performs the process at the beginning of a loop for a variable i, i.e., step S204. At step S204, the processing unit 7 adds one to the value of the variable i. Hereinafter, every time the process proceeds to step S219, the processing unit 7 adds one to the value of the variable i at step S204 and moves on to the process at step S220 when the process proceeds to step S219 after the value of the variable i has reached Nt.

At step S220, the processing unit 7 sums up the number of total votes obtained for each set of voting points listed, and sorts the sets of voting points in the descending order of the number of the total votes obtained. Subsequently, the processing unit 7 calculates the positions and the attitudes of objects W from a number G of sets obtaining the largest number of total votes (step S221), and ends the process.

The processing unit 7 also performs the process depicted in FIG. 13, thereby generating information on objects W being candidates to be held by the robot 2, and outputs the information to the robot control device 5. More specifically, the processing unit 7 measures scene data first as depicted in FIG. 13 (step S301).

Subsequently, the processing unit 7 detects a number G of candidates to be held calculated by a process (surface matching) depicted in FIG. 12 (step S302). The processing unit 7 then sets a variable t that indicates the order in which detail matching described later is performed on candidates to be held to one (step S303), and moves on to the process at step S304. At step S304, the processing unit 7 determines whether the value of the variable t is not more than G.

When determined that the value of the variable t is not more than G (Yes at step S304), the processing unit 7 moves on to the process at step S305. When determined that the value of the variable t has reached G (No at step S304), the processing unit 7 sets a flag of no candidates to the robot control device 5 (step S310), and ends the process.

At step S305, the processing unit 7 performs the detail matching on the t-th candidate to be held. For example, the processing unit 7 performs detail pattern matching by an iterative closest point (ICP) algorithm for the detail matching. The processing unit 7 then determines whether the detail matching is successful (step S306).

At step S306, when determining that the detail matching is successful (Yes at step S306), the processing unit 7 moves on to the process at step S307. When determining that the detail matching is in failure (No at step S306), the processing unit 7 moves on to the process at step S311.

At step S307, the processing unit 7 performs a hand-interference check to check whether the robot 2 performs picking operation on a candidate to be held without interference by the hand 25. The processing unit 7 determines whether the robot 2 operates without interference (step S308). When determining that the robot 2 operates without interference (Yes at step S308), the processing unit 7 moves on to the process at step S309.

When determining that interference occurs (No at step S308), the processing unit 7 moves on to the process at step S311. At step S311, the processing unit 7 adds one to the value of the variable t, and moves on to the process at step S304. At step S309, the processing unit 7 sets the position and the attitude (picking position and attitude) of the candidate to be held on which it is determined that the robot 7 operates without interference at step S308 for the robot control device 5, and ends the process.

As described in the foregoing, in the object detecting method according to the embodiment, a plurality of external reference points used as information for estimating the position and the attitude of an object are set in external space of a model of the object, and an internal reference point used as information for determining whether the information for estimation is valid is set in internal space of the model. A table is stored in which feature quantities on a local surface including a pair of a starting point and an endpoint that are sequentially selected from a point group located on a surface of the model are associated with a set of positions of the external reference points and the internal reference point with respect to the starting point.

Furthermore, in the object detecting method according to the embodiment, a pair of the starting point and the endpoint is sequentially selected from a sample point group located on a surface of the object existing in real space, and feature quantities of the object on a local surface including the pair of the starting point and the endpoint are calculated.

A set of positions associated with feature quantities matching the feature quantities of the object is acquired from the table, and is transformed into a set of positions in the real space. When the position of the internal reference point in the set of positions is outside the object, the position and the attitude of the object are estimated with the positions of the external reference points in the set of positions excluded from the information for estimation. By this object detecting method, the detection accuracy can be improved with a reduced amount of processing required for detecting the position and the attitude of the object.

In the object detecting method according to the embodiment, when the position of the internal reference point in the set of positions after the transformation is inside the object, votes are cast for each of voting points in the real space that match the positions of the external reference points in the set of positions. When the number of votes obtained for a voting point obtaining the smallest number of votes, among a set of voting points for which votes are cast based on the positions of the external reference points in the set of positions, has reached a certain threshold, the set of the voting points is listed.

Subsequently, the number of total votes obtained is summed up for each set of the voting points listed, and the position and the attitude of the object is estimated based on positions in the real space for the voting points in the set in order from the set obtaining the largest number of total votes. Accordingly, even if what is called interference occurs in which votes are cast for a voting point for which votes should not be originally cast, the accuracy of detecting the position and the attitude of the object can be prevented from decreasing.

In the object detecting method according to the embodiment, an edge of the object and an edge of the model are detected, and the point group located on the surface of the model and the sample point group located on the surface of the object are classified into points on the edge and points on a face.

Based on the shape of the object, a point to be selected as the starting point and a point to be selected as the endpoint are selected from the points on the edge and the points on the face. Consequently, in the object detecting method according to the embodiment, the position and the attitude of the object can be estimated based on more distinctive feature quantities of the local surface depending on the shape of the object, whereby the versatility can be increased.

In the object detecting method according to the embodiment, points on the face are selected as the starting point to be selected from the sample points, and points on the edge is selected as the endpoint to be selected from the sample points, whereby the accuracy of detecting an object in which the area of a plane portion in the object is relatively large can be improved.

In the object detecting method according to the embodiment, as the starting point and the endpoint to be selected from the sample points, two points are selected in which the angle between a normal vector at the starting point and a normal vector or a gradient vector at the endpoint is larger than a certain threshold. Consequently, a local surface of a portion that is not relatively distinctive in the object can be excluded from the information for estimating the position and the attitude, whereby the amount of processing required for detecting the position and the attitude can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot control method comprising:
    setting a plurality of external reference points used as information for estimating a position and an attitude of an object in external space of a model of the object, and setting an internal reference point used as information for determining whether the information for estimation is valid in internal space of the model;
    storing a table in which feature quantities on a local surface including a pair of a starting point and an endpoint that are sequentially selected from a point group located on a surface of the model are associated with a set of positions of the external reference points and the internal reference point with respect to the starting point;
    detecting a surface of the object existing in real space using a sensor;
    sequentially selecting a pair of a starting point and an endpoint from a sample point group located on the surface of the object existing in real space, and calculating feature quantities of the object on a local surface including the pair of the starting point and the endpoint;
    acquiring, from the table, the set of positions associated with feature quantities matching the feature quantities of the object, transforming this set into a set of positions in the real space, and when the position of the internal reference point in the set of positions is outside the object, estimating the position and the attitude of the object with the positions of the external reference points in the set of positions excluded from the information for estimation;
    generating a control signal on the basis of the set of positions in real space; and
    picking up the object existing in real space using a robot based on the control signal.

2. The robot control method according to claim 1, further comprising:
    when the position of the internal reference point in the set of positions after the transforming is inside the object, casting votes for each of voting points in the real space that match the positions of the external reference points in the set of positions;
    when the number of votes obtained, for a voting point obtaining the smallest number of votes, among a set of voting points for which votes are cast based on the positions of the external reference points in the set of positions, has reached a certain threshold, listing the set of the voting points; and
    summing up the number of total votes obtained for each set of the voting points listed, and estimating the position and the attitude of the object based on positions in the real space for the voting points in the set in order from the set obtaining the largest number of total votes.

3. The robot control method according to claim 2, further comprising:
    detecting an edge of the object and an edge of the model;
    classifying the point group located on the surface of the model and the sample point group located on the surface of the object into points on the edge and points on a face; and
    selecting a point to be selected as the starting point and a point to be selected as the endpoint from the points on the edge and the points on the face based on a shape of the object.

4. The robot control method according to claim 3, wherein the sequentially selecting includes:
    selecting the points on the face as the starting point to be selected from the sample points; and
    selecting the points on the edge as the endpoint to be selected from the sample points.

5. The robot control method according to claim 4, wherein the sequentially selecting includes selecting two points in which an angle between a normal vector at the starting point and a normal vector or a gradient vector at the endpoint is larger than a certain threshold as the starting point and the endpoint to be selected from the sample points.

6. The robot control method according to claim 3, wherein the sequentially selecting includes selecting two points in which an angle between a normal vector at the starting point and a normal vector or a gradient vector at the endpoint is larger than a certain threshold as the starting point and the endpoint to be selected from the sample points.

7. The robot control method according to claim 2, wherein the sequentially selecting includes selecting two points in which an angle between a normal vector at the starting point and a normal vector or a gradient vector at the endpoint is larger than a certain threshold as the starting point and the endpoint to be selected from the sample points.

8. The robot control method according to claim 1, further comprising:
    detecting an edge of the object and an edge of the model;
    classifying the point group located on the surface of the model and the sample point group located on the surface of the object into points on the edge and points on a face; and
    selecting a point to he selected as the starting point and a point to be selected as the endpoint from the points on the edge and the points on the face based on a shape of the object.

9. The robot control method according to claim 8, wherein the sequentially selecting includes:
    selecting points on the face as the starting point to be selected from the sample points; and
    selecting points on the edge as the endpoint to be selected from the sample points.

10. The robot control method according to claim 9, wherein the sequentially selecting includes selecting two points in which an angle between a normal vector at the starting point and a normal vector or a gradient vector at the endpoint is larger than a certain threshold as the starting point and the endpoint to be selected from the sample points.

11. The robot control method according to claim 8, wherein the sequentially selecting includes selecting two points in which an angle between a normal vector at the starting point and a normal vector or a gradient vector at the endpoint is larger than a certain threshold as the starting point and the endpoint to be selected from the sample points.

12. The robot control method according to claim 1, wherein the sequentially selecting includes selecting two points in which an angle between a normal vector at the starting point and a normal vector or a gradient vector at the endpoint is larger than a certain threshold as the starting point and the endpoint to be selected from the sample points.

13. The robot control method according to claim 1, wherein the surface of the object existing in real space is detected using the sensor by scanning the object with a laser beam to detect a three-dimensional shape of the object.

14. The robot control method according to claim 13, wherein the control signal is generated by a robot control device, and wherein the robot control device outputs the control signal to the robot to cause the robot to perform the picking up of the object.

15. The robot control method according to claim 1, wherein the control signal is generated by a robot control device, and wherein the robot control device outputs the control signal to the robot to cause the robot to perform the picking up of the object.

16. An object detecting device comprising:
a memory; and
a processor coupled to the memory, the processor is programmed to perform a process comprising:
setting a plurality of external reference points used as information for estimating a position and an attitude of an object in external space of a model of the object, and setting an internal reference point used as information for determining whether the information for estimation is valid in internal space of the model;
storing in the memory a table in which feature quantities on a local surface including a pair of a starting point and an endpoint that are sequentially selected from a point group located on a surface of the model are associated with a set of positions of the external reference points and the internal reference point with respect to the starting point;
detecting a surface of the object existing in real space using a sensor;
sequentially selecting a pair of the starting point and the endpoint from a sample point group located on the surface of the object existing in real space, and calculating feature quantities of the object on a local surface including the pair of the starting point and the endpoint; and
acquiring, from the table, the set of positions associated with feature quantities matching the feature quantities of the object, transforming this set into a set of positions in the real space, and when the position of the internal reference point in the set of positions is outside the object, estimating the position and the attitude of the object with the positions of the external reference points in the set of positions excluded from the information for estimation.

17. An object detecting method comprising:
setting a plurality of external reference points used as information for estimating a position and an attitude of an object in external space of a model of the object, and setting an internal reference point used as information for determining whether the information for estimation is valid in internal space of the model;
storing a table in which feature quantities on a local surface including a pair of a starting point and an endpoint that are sequentially selected from a point group located on a surface of the model are associated with a set of positions of the external reference points and the internal reference point with respect to the starting point;
detecting a surface of the object existing in real space using a sensor;
sequentially selecting a pair of a starting point and an endpoint from a sample point group located on the surface of the object existing in real space, and calculating feature quantities of the object on a local surface including the pair of the starting point and the endpoint; and
acquiring, from the table, the set of positions associated with feature quantities matching the feature quantities of the object, transforming this set into a set of positions in the real space, and when the position of the internal reference point in the set of positions is outside the object, estimating the position and the attitude of the object with the positions of the external reference points in the set of positions excluded from the information for estimation.

* * * * *